May 19, 1964   D. S. BELL   3,133,464
ADJUSTABLE TEMPLATE SYSTEM FOR MACHINING SURFACES OF REVOLUTION
Filed March 2, 1961   2 Sheets-Sheet 1
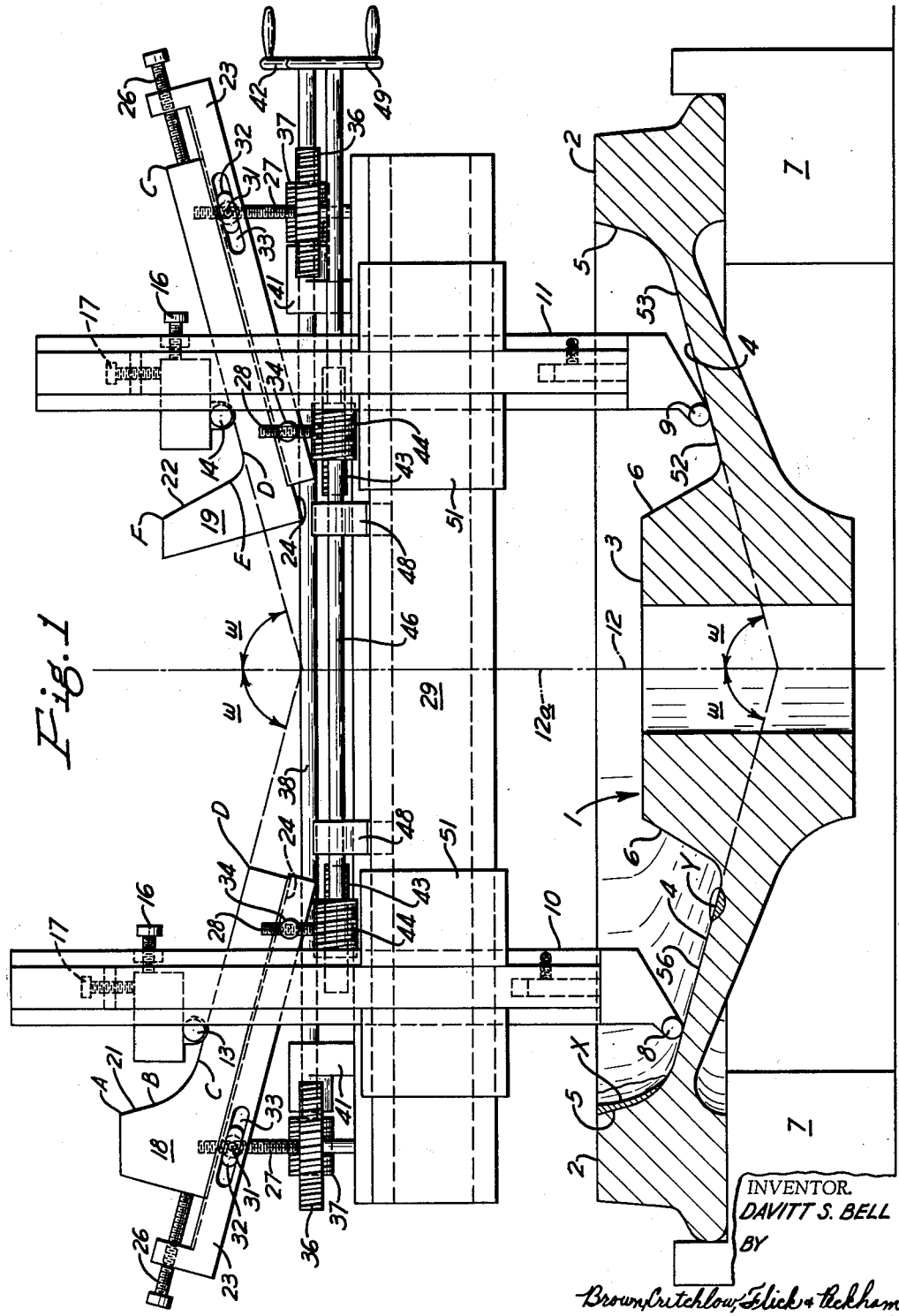
INVENTOR.
DAVITT S. BELL
BY
Brown, Critchlow, Flick & Peckham
ATTORNEYS May 19, 1964    D. S. BELL    3,133,464
ADJUSTABLE TEMPLATE SYSTEM FOR MACHINING SURFACES OF REVOLUTION
Filed March 2, 1961    2 Sheets-Sheet 2
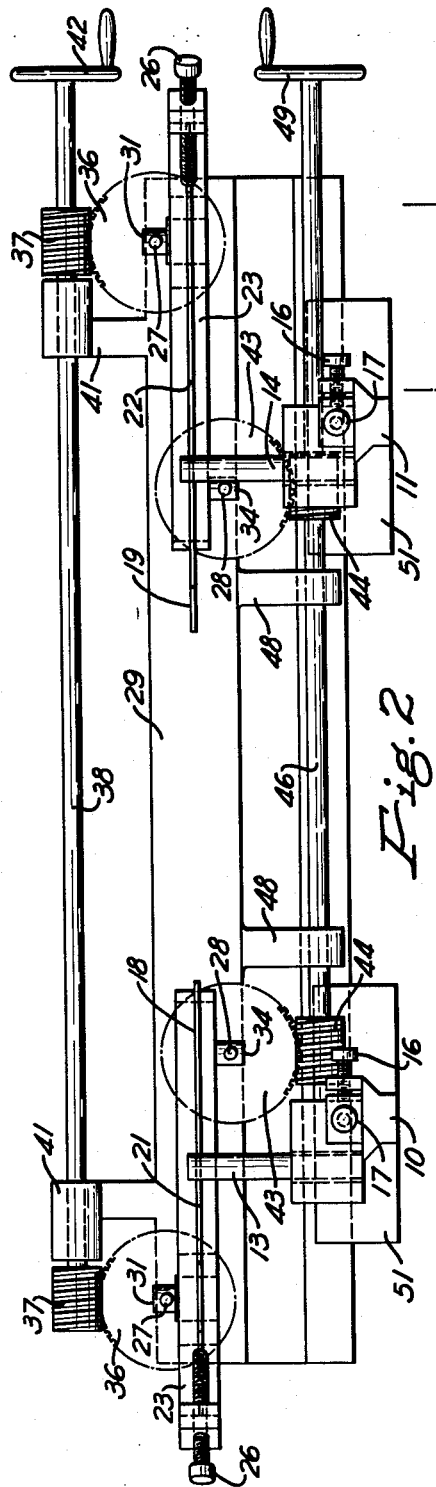
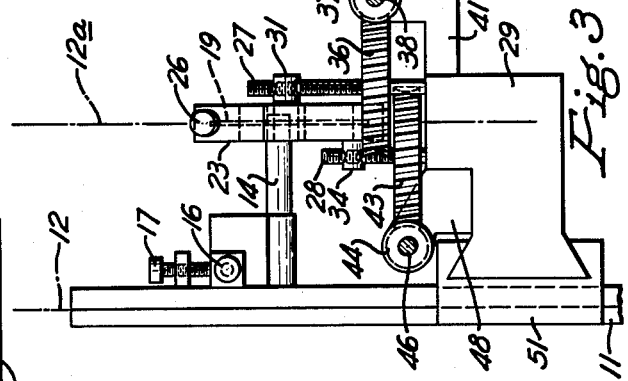
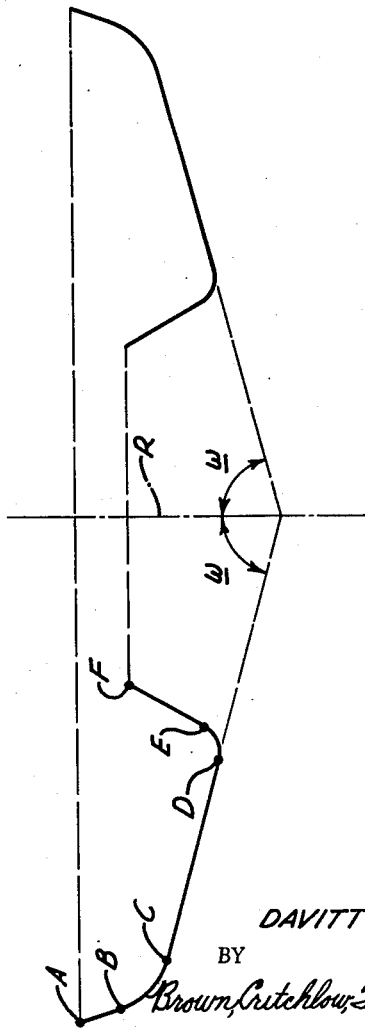
INVENTOR.
DAVITT S. BELL
BY
Brown, Critchlow, Flick & Peckham
ATTORNEYS 3,133,464
ADJUSTABLE TEMPLATE SYSTEM FOR MACHINING SURFACES OF REVOLUTION
Davitt S. Bell, Pittsburgh, Pa., assignor to Edgewater Steel Company, a corporation of Pennsylvania
Filed Mar. 2, 1961, Ser. No. 92,879
10 Claims. (Cl. 82—14)

This invention relates to an adjustable template system for the simultaneous and complementary machining of material to a desired contour by a plurality of cutting tools, where the desired contour is a surface of revolution described by a given contour line revolved about a given axis and where each cutting tool is provided with a template-following stylus that controls the operation of the tool. The invention is particularly applicable to machining successively a number of pieces of work to the same or substantially the same contour where the amount of metal to be removed varies from one piece to another, either because of dimensional variations between the pieces themselves or because of local surface imperfections that must be removed. In either case, a shift in or modification of the contour line defined by the template system may be required.

The present invention is particularly applicable to machining the plate portion of railroad car wheels. These wheels are generally made from steel blanks by a combination of hot forging and rolling. The hub of the wheel is bored for the axle and the outer rim and flange are machined concentrically with the bore. In most cases, the plate portion of the wheel between the rim and hub need not be machined; but occasionally, for example, where the rim fillet is not sufficiently concentric with the bore or where a surface defect is present, machining the wheel within accepted tolerances may make it marketable when it would otherwise have to be scrapped.

It is accordingly among the objects of this invention to provide a template system, in which a plurality of independent cutting tools will simultaneously machine on different portions of the work a surface of revolution conforming to different portions of the same contour line, and in which the template system can be modified by the operator before or during the machining operation so as to shift, with respect to the axis of revolution, the contour line defined by the machined surface.

Other objects will be apparent from the following description of a preferred embodiment of the invention in connection with the attached drawings, in which FIG. 1 is a front elevation showing the template system as used in machining the plate portion of a railroad car wheel;

FIG. 2 is a plan view of a portion of FIG. 1;

FIG. 3 is an end elevation of FIG. 2; and

FIG. 4 is a contour line, showing the cross-sectional contour of the plate portion of a railroad car wheel.

In accordance with this invention, the template system includes as many templates as there are independent, stylus-controlled cutting tools used in machining a single workpiece. In the simplest form of the invention, which is the one herein described, the template system includes two templates and two stylus-controlled cutting tools. The first template is provided with a line of trace that corresponds in contour to a first portion of the given contour line and is adapted to be traced by the stylus of the first cutting tool. The second template is provided with a line of trace that corresponds in contour to the other or second portion of the given contour line and is adapted to be traced by the stylus of the second cutting tool. The two templates are supported with their lines of trace so oriented that the cutting tools controlled thereby will each machine on different portions of the workpiece, a surface of revolution conforming to different portions of the same contour line. Adjusting means are provided for changing the angular position of each template relative to a reference line in a plane containing the line of trace of the template and the reference line. These adjusting means are interconnected by synchronizing means that will automatically change the angular position of one template in response to any change made in the angular position of the other template, thereby changing the slope, without altering the shape, of the contour line that is followed by the cutting edges of the cutting tools. Additional adjusting means may also be provided for shifting either template towards or away from said reference line, without changing the position of the other template, to vary the depth of cut of one or both cutting tools in a generally radial direction, thereby, in effect, changing the lengths of the contour line of the surface of revolution that is machined by the cutting tools.

While the invention is described herein with reference to machining the plate portion of railroad car wheels, which is the contoured surface of revolution between the rim and hub of the wheel, it will be understood that the invention is equally applicable to machining various surfaces of revolution on other machinable materials.

Referring to the drawings, there is shown in FIG. 1 a section of a railroad car wheel 1, which has a rim portion 2 and a hub portion 3. Between the rim and hub is the plate portion 4 that includes the rim fillet 5 and the hub fillet 6. The wheel illustrated in the drawing requires machining to remove the material in the cross-hatched areas X and Y (considerably exaggerated for clarity), which represent, respectively, the eccentricity of the rim fillet and a local surface defect near the hub fillet. The wheel is held in a revolving chuck 7 of a conventional turning machine, which also includes two cutting tools 8 and 9 mounted, respectively, on tool rams 10 and 11. For convenience, the cutting tools are preferably spaced 180° apart about the central axis 12 of the wheel, as shown in the drawings. Each of the tool rams 10 and 11 supports and is controlled by a template-following stylus 13 and 14, respectively. The position of each stylus with respect to the ram on which it is mounted can be adjusted by a horizontal adjusting screw 16 and a vertical adjusting screw 17. Such adjustable mounting of styli is conventional and is shown somewhat diagrammatically in the drawings; other conventional portions of the turning machine itself are omitted.

The plate section of a typical railroad wheel should conform generally to the contour line ABCDEF, shown in FIG. 4. This line comprises a straight rim fillet portion AB, a straight plate portion CD, and a straight hub fillet portion EF, which are connected by curved portions BC and DE to form a continuous contour line. This contour line, when revolved about an axis of revolution R, describes a surface of revolution to which the machined surface of the plate portion of the wheel desirably conforms within certain accepted tolerances. Those tolerances include variations, among others, in the length and slope of the straight portions AB, CD, and EF of the contour line. In order that the cutting edges of the cutting tools will move along the desired contour line, the styli that control their movement follow templates 18 and 19. Template 18 has a surface or edge providing a line of trace 21, which is followed by stylus 13, conforming to a first portion ABCD of the desired contour line. The other template 19 is provided with a similar line of trace 22, which is followed by stylus 14, conforming to the portion CDEF of the desired contour line. In other words, in the embodiment shown, each line of trace includes a common straight portion CD of the contour line. Such overlapping of the lines of trace is not essential, but it is a desirable feature that facilitates complete machining of the wheel plate section and permits the cutting tools to start and finish at various different points on the wheel surface.

Each of the templates 18 and 19 is slidably supported in a template holder 23 in any suitable manner, and preferably with the straight lower edge 24 of each template parallel to the straight portion CD of its line of trace. An adjusting screw 26 at the end of each holder permits longitudinal adjustment of each template in a direction parallel to said straight portion of its line of trace.

The template holders 23 are each supported by a pair of spaced adjusting screws 27 and 28 on a horizontal rail 29, so that the line of trace of each template will preferably lie either in a plane containing the axis of revolution 12, as when the cutting edges of the cutting tools 8 and 9 are in the same vertical plane as their controlling styli 13 and 14, or in a plane parallel to a plane containing the axis of revolution 12, as shown in the drawings, where the styli are not directly above the cutting tools. In the latter case, the extensions of the straight portions CD of the lines of trace 21 and 22 intersect a reference line 12a that is parallel to the axis of revolution 12 (see FIGS. 1 and 3). Each pair of adjusting screws 27 and 28 is spaced apart the same distance as the other pair. The lower unthreaded end of each screw is rotatably received in the top of rail 29. The upper portion of each screw 27 is threaded transversely through a rod 31, on the end of which is rotatably mounted a slide 32. This slide is received within a slot 33 in the side of the template holder and permits the template holder to be tilted at various angles without displacing the axis of screw 27. The upper portion of each screw 28 is threaded transversely through a rod 34, one end of which is rotatably received in a hole in the template holder. Accordingly, the slope of each line of trace with respect to the reference line 12a, as measured by the angle $w$ between the straight portion CD of the line of trace extended and said reference line, can be varied by pivoting each template holder 23 about either one of the rods 31 or 34 (by turning adjusting screw 28 or 27, respectively) or about any other given point in the axial plane containing the template (by adjusting both screws 27 and 28 by different amounts). In addition, the position of each line of trace can be displaced parallel to the reference line 12a, without changing its slope, by simultaneous and equal adjustments of screws 27 and 28.

Since the cutting tools are controlled by styli following two separated templates, the latter must be so oriented that their combined lines of trace will guide the cutting tools along different portions of the same contour line. In the embodiment shown in the drawings, the templates may be initially oriented by manipulating their adjusting screws 27 and 28 so that the straight portions CD of their lines of trace or the bottom edges 24 of the templates make equal vertical angles $w$ with the reference line 12a. This angle is herein referred to as the slope of the template or of its line of trace. Where the templates are 180° apart on opposite sides of the reference line 12a, as in the illustrated embodiment, it will be noted that the angles $w$ are equal but of opposite sign, reflecting the fact that the inclined straight portions CD common to both lines of trace are not parallel to each other but mirror images of one another.

After the templates have been initially oriented by adjusting their slope as described above, the adjusting screws of one template holder are connected by suitable synchronizing means with the corresponding adjusting screws of the other template holder. For example, as shown in the drawings, each of the two adjusting screws 27 (one for each template holder) has a worm gear 36 mounted thereon; and those gears are turned by worm drives 37 mounted on a common shaft 38, which is rotatably supported by arms 41 extending from the rail 29. A crank 42 (omitted in FIG. 3 for clarity) at one end of the shaft 38 permits simultaneous and equal manual adjustment of both screws 27. Similarly, the two adjusting screws 28 (one for each template holder) are interconnected through worm gears 43, worm drives 44, and a shaft 46, the latter being rotatably supported by arms 48 and provided with a crank 49 (also omitted from FIG. 3). If desired, suitable indexing means (not shown) may be associated with each of the cranks 42 and 49, so that adjusting screws 27 and 28 can be readily turned to a given setting. Accordingly, by proper manipulation of cranks 42 and 49, the template system as a whole can be shifted vertically without changing its slope or its slope relative to the reference line 12a can be changed as desired.

In using the template system of this invention for machining the plate portion of a railroad car wheel, the contour line defined by the template system is first adjusted to the desired slope (within accepted tolerances) for the specific wheel being machined. This slope may be conveniently determined by the following procedure. One of the tool rams, for example, ram 11 on its carriage 51 is moved along rail 29 by the conventional feed mechanism (not shown) of the turning machine into a first position where its stylus 14 is directly over the axis of pivot rod 34 in template holder 23. The ram is then lowered, either by turning stylus-adjusting screw 17 or by turning crank 49 connected to template-elevating screws 28, until cutting tool 9 contacts the face of the wheel at some point 52 near the hub fillet 6. Ram 11 is then moved to the right an arbitrary distance to a second position where cutting tool 9 is brought into contact with some point 53 on the plate section of the wheel near the rim fillet 5. This latter contact is effected without changing the setting of screw 17, and any adjustment necessary to change the height of the cutting tool is made by tilting template 19 about pivot rod 34 by turning crank 42, which is connected to template-elevating screws 27. The two spaced points 52 and 53 define the slope of the straight central portion of the plate section of the particular wheel; and, by the foregoing procedure, the corresponding portion CD of the contour line defined by template 19 will be adjusted to that slope. At the same time, the corresponding portion of template 18 will automatically assume this slope also, because of the synchronizing connection between adjusting screws 27 and 28. The next step is to adjust the other cutting tool 8 to the proper height by turning adjusting screw 17 on tool ram 10 to bring cutting tool 8 in contact with the surface of the wheel at one of the same points 52 or 53 (as by rotating the wheel through 180°). Both tools 8 and 9 will now be set to the same cutting depth, which can be increased or decreased during the subsequent machining operation either by identical adjustments of screw 17 on each ram, which raises or lowers the tool ram, or by turning cranks 42 and 49 in the proper direction by the same amount, which raises or lowers the templates without changing their slope.

In machining the specific wheel shown in FIG. 1, which has a surface defect Y near the hub fillet 6, the slope of the template holders can be further adjusted (within accepted tolerances) to remove more material in the area of the defect, with a minimum change in the depth of cut in other areas. This can be done by turning crank 49 to lower pivot rods 34 on adjusting screws 28, thereby rotating the templates about pivot rods 31. This adjustment in the slope of the templates can be made either during the machining operation or by taking an initial cut on the wheel through this area to the bottom of the defect with cutting tool 9. The resulting machined groove on the surface of the wheel will then represent the maximum depth of cut necessary at that point and can be used as one of the reference points in determining the slope of the templates. Alternatively, the slope of the templates can be set, in accordance with the procedure outlined in the preceding paragraph, without reference to this local defect, and the defect can be removed during the machining operation by turning adjusting screw 17 to vary the local depth of cut of cutting tool 9.

Another initial adjustment of the template system is the longitudinal positioning of templates 18 and 19 on their holders 23 by means of adjusting screws 26. Each template can be adjusted in this way independently of the other template, and the effect of these adjustments is to shorten or lengthen the straight portion CD of the desired contour line (see FIG. 4) or to displace the entire contour line radially. The adjustment of template 18 determines the inside diameter of the rim fillet 5, while the adjustment of template 19 determines the outside diameter of the hub fillet 6. The templates may be initially positioned on their holders so that their controlled cutting tools will touch points on the rim and hub fillets, and the machining of those portions of the wheel can thereafter be controlled either by further adjustment of screws 26 to move the templates radially or by adjustment of screws 16 to move the tool rams 10 and 11 radially with respect to their controlling styli. Alternatively, where the amount of metal to be removed from the fillets is not large, the templates may be initially positioned on their holders so that the cutting tools, when following the hub and rim fillet portions of those templates, will machine the final desired contour on the corresponding portions of the wheel. In this latter case, the position of the templates on their holders may be adjusted while taking an initial cut at the top of the fillets until the desired maximum radial depth of cut has been reached. Any of the foregoing procedures, or combinations of them, relating to template 18 and cutting tool 8 may be followed to correct the eccentricity of the rim fillet 5 on the specific wheel shown in FIG. 1.

Since the surface speed of the work varies with the radial distance from the axis of revolution 12, it will generally be desirable to have the cutting tools traverse the work in the same radial direction, so that there will be a minimum disparity between the surface speed of the work relative to the two cutting tools as they move radially of the revolving workpiece. For example, cutting tool 8 can begin its cut at the center of the wheel plate section, say at point 56, and move radially outward towards the rim fillet, while cutting tool 9 can begin its cut at the top edge of the hub fillet and move radially outward towards the center of the plate section.

Various modifications can be made in the template system described above. For example, the two templates and the cutting tools controlled thereby can be positioned 90° apart, or at some other desirable angle, about the axis of revolution of the wheel, rather than 180° apart as shown in the drawings. There may also be more than two templates, each controlling a separate cutting tool for simultaneously machining different portions of the workpiece in conformity with different portions of the same contour line.

The "slope" of the line of trace of each template, as that term is used herein and in the appended claims, refers to the angle between a straight portion of the line of trace that is common to the lines of trace of each template and a reference line lying in the same plane as the line of trace. Generally, this reference line will either coincide with the axis of revolution of the workpiece or be parallel thereto. Where the lines of trace do not have a common straight portion, their "slope" is measured in some other appropriate manner that will orient them in the same relationship as their corresponding portions of the contour line defining the surface of revolution to be machined, as, for example, the angle between tangents to the lines of trace at a given point that is common to the lines of trace of each template and a given reference line lying in the plane of the line of trace.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A template system for the simultaneous and complementary machining of material to a desired contour by a plurality of spaced independent cutting tools where the desired contour is a surface of revolution described by a given contour line revolved about a given axis and where each cutting tool is provided with a template-following stylus that controls the operation of the tool, said template system comprising a first template having a line of trace conforming to a first portion of the given contour line and adapted to be traced by the stylus of the first tool, a second template having a line of trace conforming to a second portion of the given contour line and adapted to be traced by the stylus of the second tool, means supporting the templates with their lines of trace lying in a plane containing a given reference line, said means being adjustable to change the slope of the line of trace of each template relative to said reference line to conform to the desired slope of the corresponding portion of the given contour line, and synchronizing means interconnecting the adjustable supporting means of one template with the corresponding adjustable supporting means of the other template after the lines of trace of both templates have been initially adjusted to the same slope, said synchronizing means being operable to change the slope of the line of trace of one template in response to, and by the same amount relative to said reference line as, any change made in the slope of the line of trace of the other template.

2. Apparatus according to claim 1, in which the template system includes two templates disposed 180° apart about said reference line.

3. Apparatus according to claim 1, in which a portion of each line of trace conforms to the same portion of the given contour line.

4. Apparatus according to claim 1 that includes a fixed member, and in which the supporting means for each template includes a template holder and a pair of spaced adjusting screws supporting the template holder on the fixed member.

5. Apparatus according to claim 4, in which each template is slidably supported in its template holder for generally radial movement relative to said reference line, and separate and independently operable means for adjusting the generally radial position of each template in its holder.

6. Apparatus according to claim 1 that includes a fixed member, and in which the supporting means for each template includes a template holder and a pair of parallel adjusting screws spaced radially of said reference line for supporting the template holder on the fixed member, the adjusting screws for one template being spaced apart the same distance as the adjusting screws for the other template, and in which the synchronizing means includes a mechanical coupling between the radially outer adjusting screws of both templates and a second mechanical coupling between the radially inner adjusting screws of both templates.

7. Apparatus according to claim 6, in which each mechanical coupling includes a separate worm gear fixed to each adjusting screw and a worm drive engaging each gear and a rotatable shift on which both worm drives are mounted and means for rotating the shaft.

8. A template system for the simultaneous and complementary machining of material to a desired contour by a pair of spaced independent cutting tools where the desired contour is a surface of revolution described by a given contour line revolved about a given axis and where each cutting tool is provided with a template-following stylus that controls the operation of the tool, the template system comprising a first template having a line of trace corresponding to a first portion of the given contour line and adapted to be traced by the stylus of the first tool, a second template having a line of trace corresponding to part of the first portion and also to an adjacent second portion of the same contour line and adapted to be traced by the stylus of the second tool, means supporting the templates with their lines of trace lying in a plane containing a given reference line, said means being adjustable to change the slope of that portion of the line of trace of each template corresponding to the portion of the given contour line that is common to both lines of trace, and synchronizing means interconnecting the adjustable supporting means of one template with the corresponding adjustable supporting means of the other template for changing the slope of the line of trace of one template in response to, and by the same amount relative to said reference line as, any change made in the slope of the line of trace of the other template.

9. Apparatus according to claim 8, in which the portion of the given contour line that is common to both lines of trace is a straight line.

10. Apparatus according to claim 8, in which the given reference line coincides with the axis of revolution of the material being machined.

References Cited in the file of this patent

UNITED STATES PATENTS

| | | |
|---|---|---|
| 1,077,279 | Ito | Nov. 4, 1913 |
| 1,933,798 | Gerbers | Nov. 7, 1933 |
| 2,397,108 | Hanna et al. | Mar. 26, 1946 |

FOREIGN PATENTS

| | | |
|---|---|---|
| 594,030 | Canada | Mar. 8, 1960 |